(12) United States Patent
Stenberg

(10) Patent No.: US 8,152,134 B2
(45) Date of Patent: Apr. 10, 2012

(54) VALVE WITH REGULATING FUNCTION

(75) Inventor: Daniel Stenberg, Boras (SE)

(73) Assignee: Tour & Andersson AB, Ljung (SE)

( * ) Notice: Subject to any disclaimer, the term of this patent is extended or adjusted under 35 U.S.C. 154(b) by 534 days.

(21) Appl. No.: 12/443,187

(22) PCT Filed: Aug. 15, 2007

(86) PCT No.: PCT/SE2007/000722
§ 371 (c)(1),
(2), (4) Date: Mar. 27, 2009

(87) PCT Pub. No.: WO2008/041898
PCT Pub. Date: Apr. 10, 2008

(65) Prior Publication Data
US 2010/0043893 A1    Feb. 25, 2010

(30) Foreign Application Priority Data
Oct. 4, 2006  (SE) ...................................... 0602073

(51) Int. Cl.
*F16K 1/44*    (2006.01)
(52) U.S. Cl. ........ 251/121; 251/123; 251/170; 251/334; 251/359; 251/364; 137/557; 137/614.19
(58) Field of Classification Search .............. 251/120, 251/121, 123, 170, 333, 334, 359, 363, 364; 137/486, 557, 614.19
See application file for complete search history.

(56) References Cited

U.S. PATENT DOCUMENTS

| | | | | |
|---|---|---|---|---|
| 1,558,330 A * | 10/1925 | Garfield | ...................... | 137/556.6 |
| 1,699,217 A * | 1/1929 | Wilson | ........................... | 251/334 |
| 2,623,726 A * | 12/1952 | Suska | ........................... | 251/364 |
| 2,657,897 A * | 11/1953 | Folmsbee | ...................... | 251/333 |
| 2,875,978 A * | 3/1959 | Kmiecik | ........................ | 251/333 |
| 2,886,283 A * | 5/1959 | Natho | ............................ | 251/175 |
| 3,572,382 A | 3/1971 | Luthe | | |
| 3,572,385 A | 3/1971 | Acosta | | |
| 3,771,562 A | 11/1973 | Curran | | |
| 4,164,168 A * | 8/1979 | Tateoka | ....................... | 91/376 R |
| 4,188,013 A * | 2/1980 | Battersby et al. | ............. | 251/175 |
| 4,611,788 A * | 9/1986 | Thomsen | ...................... | 251/363 |
| 4,715,579 A * | 12/1987 | Hammarstedt | ................ | 251/121 |
| 6,168,168 B1 * | 1/2001 | Brown | ........................... | 277/637 |
| 6,623,012 B1 * | 9/2003 | Perry et al. | .................... | 277/550 |
| 2004/0149950 A1 | 8/2004 | Fitzgerald et al. | | |
| 2005/0163638 A1 * | 7/2005 | Engelbrektsson | ............ | 417/572 |

FOREIGN PATENT DOCUMENTS

WO    03/089820 A1    10/2003
WO    WO 2006130061 A1 *    12/2006

* cited by examiner

*Primary Examiner* — Craig Schneider
*Assistant Examiner* — William McCalister
(74) *Attorney, Agent, or Firm* — Davis & Bujold, P.L.L.C.

(57) ABSTRACT

A terminal valve having a cone (9) that communicates with a valve seat (10) of a seat ring (19) and cooperates with a veil (12) to control flow. The valve seat (10) and the veil (12) together form a sealing element, which seals against the cone (9) as well as the valve body (1). The cone (9) has a cylindrical portion (46) with slits (49, 50) that form a flow passage area which allows a flow that corresponds to a modified logarithmic function.

15 Claims, 5 Drawing Sheets

VALVE WITH REGULATING FUNCTION

This application is a National Stage completion of PCT/SE2007/000722 filed Aug. 15, 2007, which claims priority from Swedish patent application serial no. 0602073-9 filed Oct. 4, 2006.

FIELD OF INVENTION

The present invention relates to a valve, preferably a terminal valve, in a heating or cooling system—and in which the main function is to regulate a suitable flow through the valve/the system, which flow can be maximized, regulated and controlled.

BACKGROUND OF INVENTION

The new features of this construction in comparison to known technology are, that a completely new cone and a new seat has been developed, which offer several advantages compared to existing constructions. The cone/seat cooperates also with a veil, which means, that the passage in the valve can be preadjusted, i.e. it is possible to choose a maximum flow, when the cone is in its upper position—what the artisans call a Kvs-value—and with this chosen Kvs-value as an initial value it is also possible to regulate the flow from 0 and up to Kvs, this flow having a desirable feature, because the cone has a newly developed shape and also preferably is made of a polymer.

The construction offers the following advantages in comparison to existing construction solutions:

a guaranteed reproduction of dimensions of the cooperative parts and then in particular of the cone and the seat;

a regulating function, the flow as a function of the percentage opening of the cone having a desirable, preferably modified, logarithmic feature;

the regulatory function being combined with a variable Kvs-value and with a maintained feature according to what has been stated above;

the tightness between the cone, the valve seat and the valve body being secured by means of a newly developed packing and seat ring; and the requirements as to the cutting machining of the seat and the cone can be reduced, with a maintained, secured function.

These above-mentioned advantages of the novel construction are realized according to the present invention, because the construction according to the type set forth in the introduction. Additional characterizing features and advantages of the present invention will be set forth in the following description, reference being made to the enclosed drawings, which depict a preferred but not limiting embodiment of the invention.

BRIEF DESCRIPTION OF THE DRAWINGS

In detail is shown in diametrical, partially schematic sections or in perspective views.

DETAILED DESCRIPTION OF THE PREFERRED EMBODIMENTS

Figure 1:
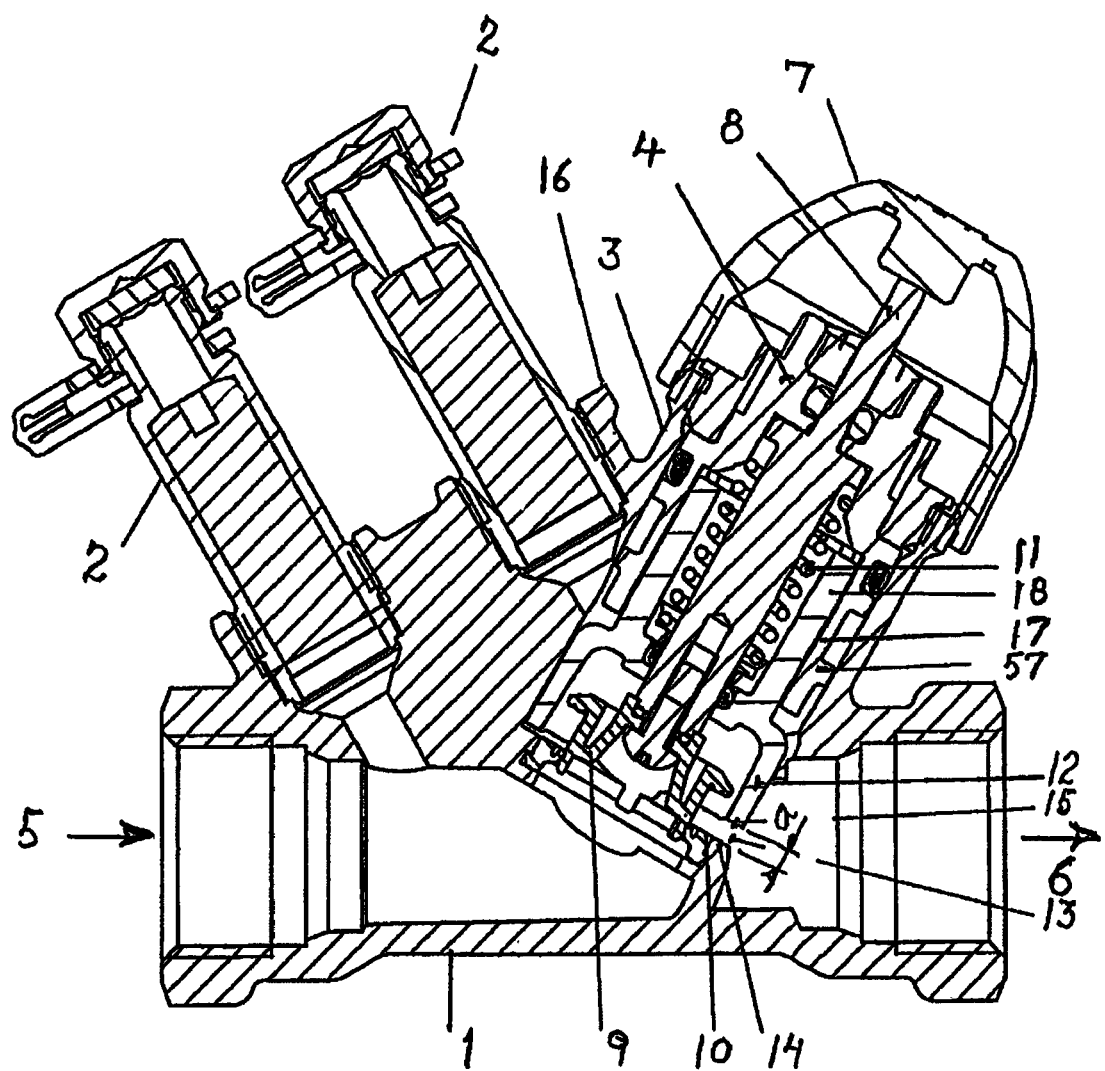
FIG. 1 an assembly of an embodiment of a valve according to the invention.

FIG. 1 exemplifies, how a complete valve, based on the novel construction elements may be designed.

Thus, the complete valve may be designed with variations as to e.g. the valve body, which can be designed in a special way; and as another variation the valve may e.g. be provided with other adjustment means than the hand wheel, shown in the figure, and still be inside the scope of the inventive idea.

In FIG. 1 valve body 1 is provided with two measuring nipples 2 and with a knee 3, in which a complete valve case 4 is mounted.

Through the measuring nipples a present drop of pressure in the valve can be measured, from its inlet side 5 to its outlet side 6, and in this way the present flow through the valve can be measured and be known, since during the development of the valve its features have been tested and verified, i.e. the relationship between the drop of pressure across the valve and the volume of the passing medium/flow.

In FIG. 1 a hand wheel 7 is mounted, which can actuate spindle 8, the spindle, with a mounted cone 9, being allowed to be pressed downwards towards valve seat 10, when the flow through the valve is to be reduced/stopped. When the valve is to be opened up, the hand wheel is to be turned in the opposite direction; and cone 9 is then moved upwards from valve seat 10, valve case 4 having a spring 11, which always strives to move the cone/the spindle upwards and away from the seat.

In order to be able to regulate the maximum flow through the valve, which flow the artisans call the Kvs-value, the valve case is provided with a screen wall, a veil which can be pivoted in relation to the valve body and its passage 13, passage 13 being machined in the front part of the valve body, between the area above the seat and outwards towards outlet side 6. In FIG. 1 this passage 13 has a limited free height, called "a" between plane 14, which is located in the valve body and which is in the same plane as valve seat 10 and lower edge 15 of the veil. The veil is at its lower edge provided with a "staircase" design, which means, that the free height "a" gradually increases stepwise from being 0, i.e. being completely in the same plane as plane 14, and to a maximum "a-value", the various "a-values" all being researched in order to obtain the suitable Kvs-flows through the valve.

In order to obtain a certain Kvs-value, veil 12 must be turnable. The veil is turned in order to obtain a certain drop of pressure across the valve and since the features of the valve are known, every drop of pressure will correspond to a certain flow—a certain Kvs-value and this adjustment is always done with the cone in its entirely open position.

Also, the position of the veil, i.e. its turning position, is known, since valve case 4 only can be mounted in a rotational position in relation to knee 3 and at the same time the mounting position of the veil in valve case 4 is given, since veil 12 also has a certain rotational position in the complete valve case 4. The change of the position of the veil is done with a preadjustment tool or the like—not described or shown in the present description. This preadjustment tool preferably is provided with an index disc, which shows a numerical value, which can be read against a stationary index 16 on valve body 1. A certain adjusted index value means, that the valve then has a Kvs-value, which is known and which consequently always can be controlled through measuring the drop of pressure in measuring nipples 2, not only when aligning a construction but also in a later specific situation and consequently it is always possible to examine a construction in order to see, which flows are used and whether they correspond to the values, which are supposed to be valid. In order to facilitate tightening of the valve, when the cone is lowered and seals against the seat, a gap 17 is used, in which the pressure level, which is present on the return side, is forwarded upwards to cavity 18 above and around the spindle, and in this way a counter force is obtained, a force directed downwards towards the seat and this will lower the required force, the tightening force required to keep the cone in its lowermost closed position.

The design of the cone and the seat is described in detail in connection with FIGS. 2-5.

Figure 2:
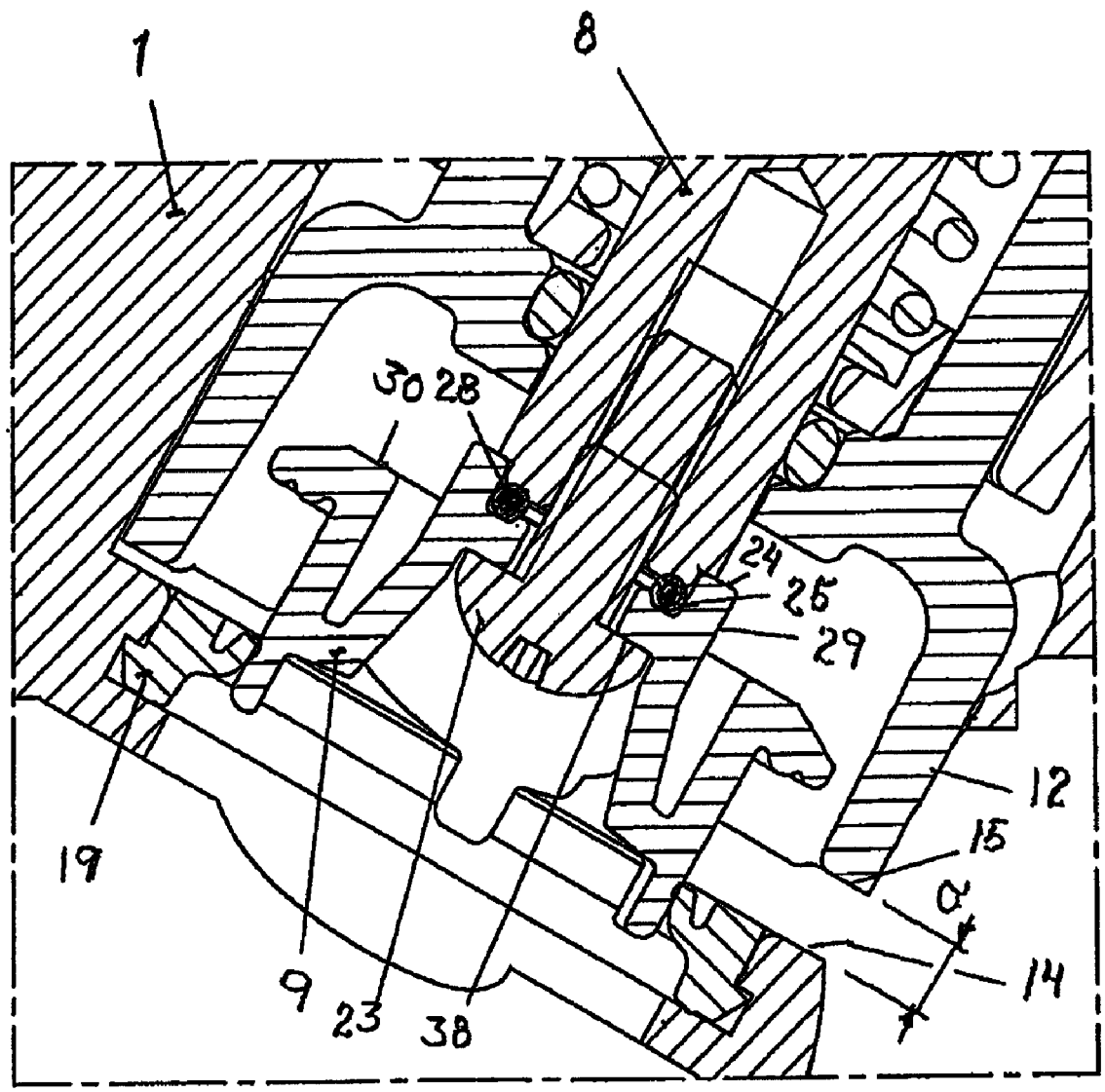
FIG. 2 a sectional view of a cone, a seat ring and a veil.

FIG. 2 shows, how cone 9, seat ring 19 and veil 12 are cooperating.

Cone 9 is mounted on spindle 8 with a screw 23, which forces an inner cylinder plane 38 on the cone upwards and towards the spindle, at the same time as screw 23 is threaded onto the spindle from below. In order to position the cone at right angles to the longitudinal axis of the spindle the cone is in its upper part provided with a neck 29, which extends preferably 1-3 mm upwards from the upper cylinder plane 30 of the cone. The neck has an outer diameter, which preferably is roughly the same or slightly larger than the outer diameter of spindle 8 and the neck has in its upper part an inner part 25, which is designed in such a way, that an O-ring 28 preferably can be mounted in part 25 and also neck 29 has an upper end surface 24, against which the spindle is stopped, when screw 23 is tightened, and this also allows a correct mounting position, the correct prestressing in O-ring 28. As an alternative to an O-ring 28 cone 9 can be designed with one or several wave crests on the inner cylindrical plane 38 of the cone in order to, when screw 23 is tightened, obtain a tightening between the screw head and the inner surface of the cone. The function of O-ring 38 or alternatively the tightening between the screw and the waved inner plane 38 is to present an unintentional leakage from the bottom side of the cone outwards towards its upper side and consequently outwards towards return side 6.

In FIG. 2 veil 12 has been turned, a marginal "a"-measurement being shown between lower edge 15 of the veil and plane 14, which is positioned in valve body 1, this plane 14 being positioned at the same level as the upper side on seat ring 19.

Figure 3:
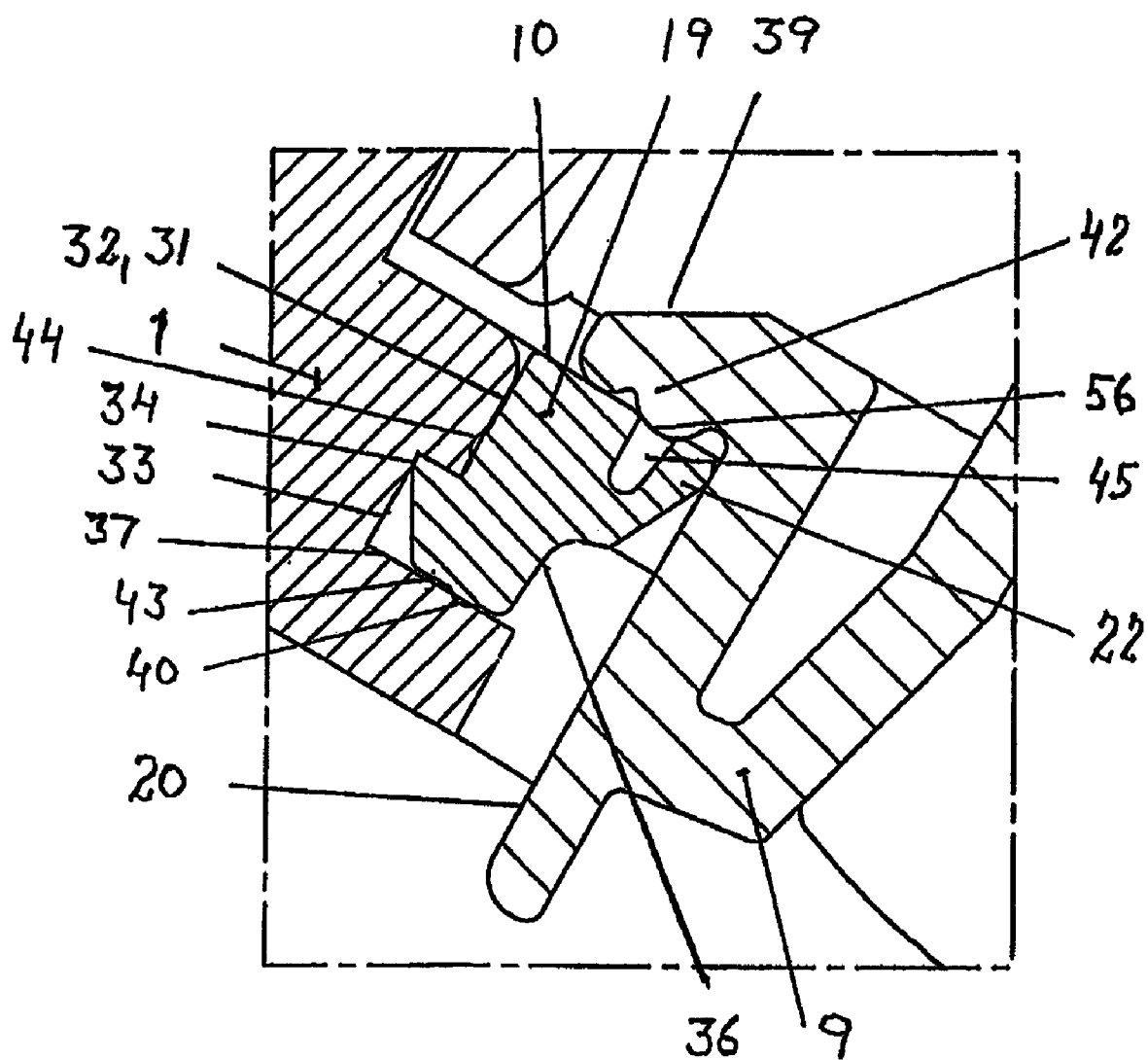
FIG. 3 a sectional view of the seat/the cone.

In FIG. 3 seat ring 19 is mounted in valve body 1 and in this figure cone 9 is positioned in its lower closed position.

Seat ring 19 preferably is made of, e.g. molded from a suitable plastic or rubber material, and with a form stability, which meets the functional requirements, which are valid for the seat ring.

An alternative design of seat ring 19 is to use a core, which suitably is a metal core or a plastic core. Around this core a suitable rubber material is mounted, which through a cure or the like binds the cone and the rubber parts together into a unit, to seat ring 19.

The mounting of the seat ring is done from the side of valve case 4 by compressing the seat ring downwards into the machined zone, which is obtained in the valve body, outer diameter 31 of the seat ring being coordinated with the diameter, which machining 32 in the valve body has obtained. Also, this machining has a second machining 33, which means, that the diameter of machining 32 is increased with preferably 0.5-2 mm, this machining having an axial depth of preferably 1-5 mm and being coordinated with seat ring 19 in such a way, that outer diameter 31 of the seat ring also is increased in the zone, which cooperates with machining 33. The measurements of machining 33 is only one example and of course depends on the value dimension, which is used. When the seat ring is mounted downwards into the valve body, the outer lower part 34 of the seat ring will snap into machining 33 and in this way the seat ring will be firmly anchored in valve body 1. In order to prevent unintentional leakage between the valve body and the seat ring, the seat ring is provided with a sealing edge 44, which seals against machining 32.

The upper side of the seal ring is valve seat 10 according to the present invention, and this valve seat is positioned in the same plane as plane 14 of the valve body.

The design of the seat ring provides several functions.

Seat ring 19 functions as a combined sealing element and a valve seat 10. The seat ring has an inner diameter 36, which preferably is slightly larger than cone 9 and its outer diameter 20. However, the seat ring will seal against outer diameter 20 of the cone and consequently the seat ring has a sealing lip 22, which extends from inner diameter 36 of the ring and slightly further than into outer diameter 20 of cone 9. In connection with the arriving of cone 9 into its closed position flange 39 of the cone and its lower side will exert a pressure against the upper side of the seat ring.

The flange portion of the cone is provided on its lower side with a few wave crests/valleys 42 and a wave crest has the same mean diameter as a groove, a recess 45, preferably a width of 0.2-1 mm and a length of 0.5-2 mm, in the upper outer part of the seat ring, valve seat 10 and which constitute the delamination between sealing lip 22 and the upper part of the seat ring, and where wave crest 56 of the cone partially reaches downwards into recess 45—the wave length preferably being about 1.5-3 times the length of the width of recess 45—sealing lip 22 being pressed inwards towards the outer diameter 20 of the cone with a better sealing function as a result. The above-mentioned measurements of recess 45 are only one example, the measurement of seat ring 19 of course depending on the size of the valve, into which the seat ring is to be mounted.

The seat ring also is provided with a wave-shape design, a sealing edge 40 in its lower surface 43, namely the surface, which after the mounting of the seat ring is pressed against bottom 37, which constitute the lower part of swing machining 33 and where this bottom as to its diameter preferably has the same inner diameter 36 as the seat ring. Since the seat ring is pressed against bottom 37 an unintentional leakage from inlet side 5 of the valve to outlet side 6 via outer diameter 31 of the seat ring is prevented. As a complement to the sealing at bottom 37 the seat ring also is provided with a sealing edge 44 on its outer diameter 31, which seals against machined surface 32.

Figure 4:
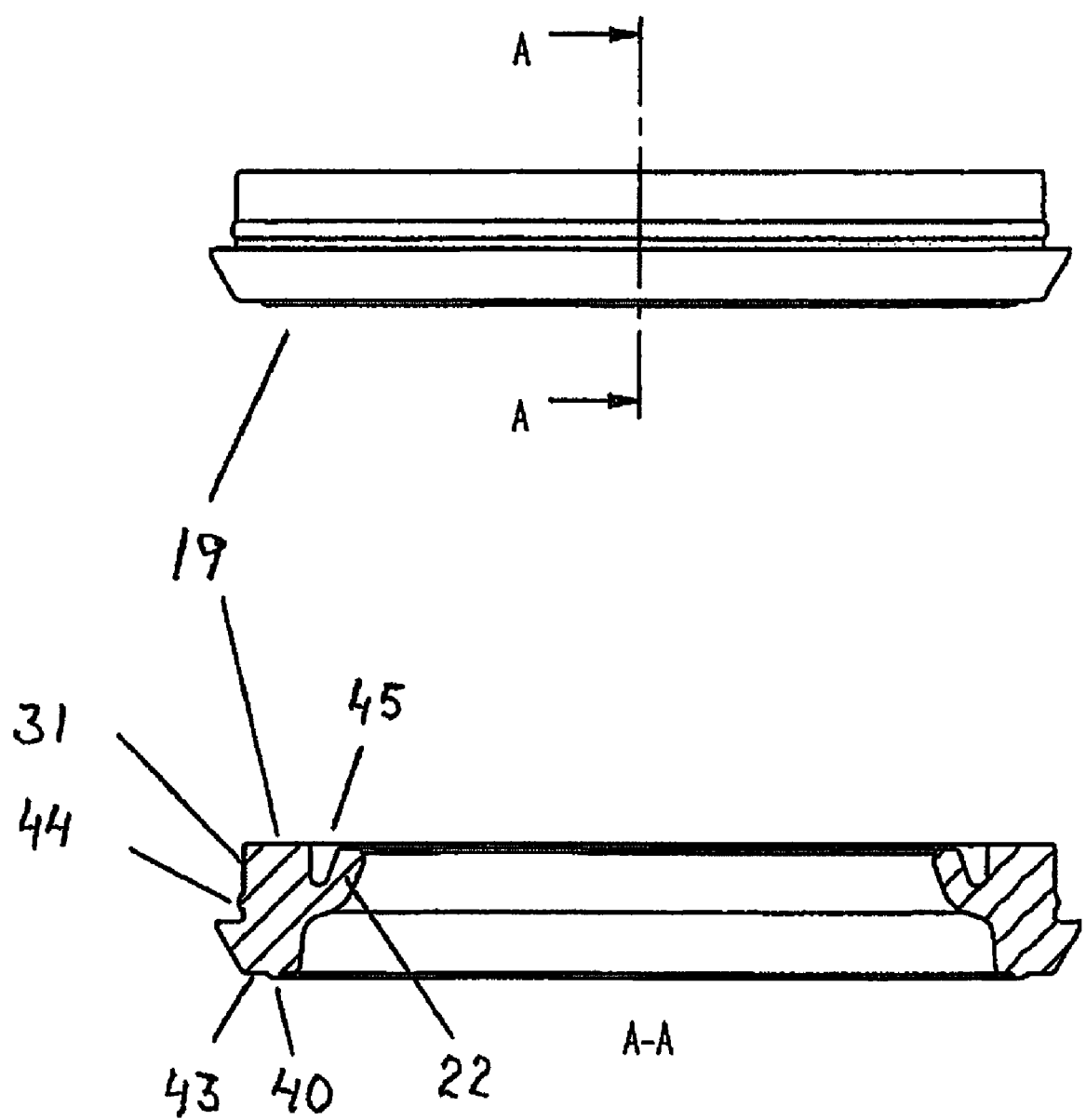
FIG. 4 an external and sectional view of the seat ring.

FIG. 4 shows seat ring 19 in one external and one sectional view.

The seat preferably is preferably made of a plastic or rubber material, which allows reproduction of the detail with small measurement tolerances and with a certain degree of elasticity, those parts, which constitute sealing zones, i.e. sealing lip 22 and the wave-formed sealing edges 44 on outer diameter 31 and 40 of the ring on lower surface of the ring obtaining a certain elasticity. Groove or recess 45 in the upper surface of the ring, in seat 10, is a requirement for the mobility of sealing lip 22, the starting position of which being, that the lip has an inner diameter, which is the same or slightly smaller than outer diameter 20 of the cone. In a normal operational position, when the cone is slightly drawn out or raised from seat 10, sealing lip 22 seals against the outer diameter of the cone, such that in the operational position, when the cone is completely closed, a stronger sealing effect is obtained thanks to the wave-shaped part 42 of the cone, and when a slightly higher wave crest 56 extends downwards partly into recess 45 and consequently compresses sealing lip 22 further towards the outer diameter of the cone.

Figure 5:
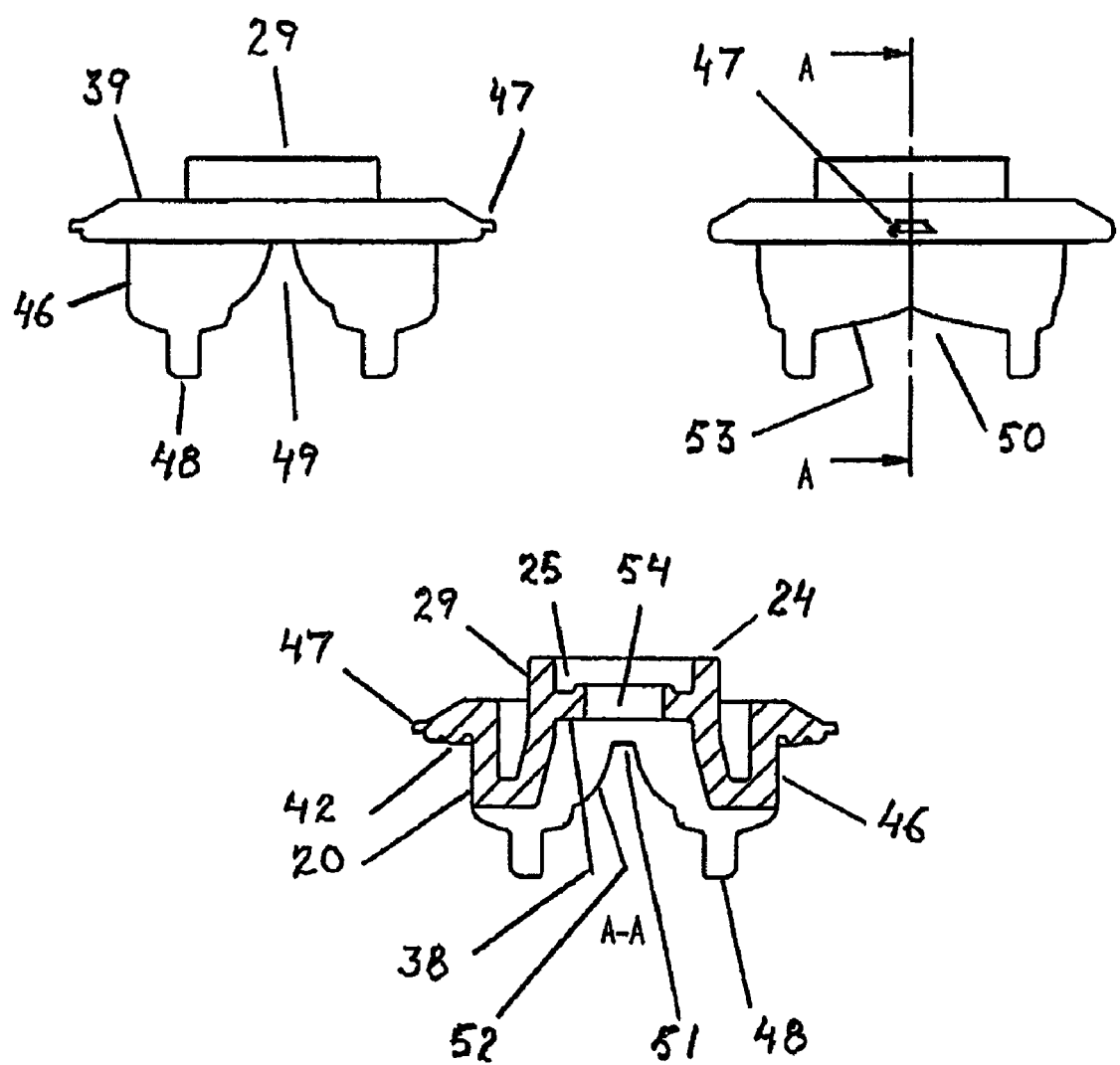
FIG. 5 an external and sectional view of the cone.

FIG. 5 shows cone 9 in an external and a sectional view.

The cone preferably is made of a shape-stable plastic material, but it can also be made of a metallic material, e.g. brass.

The cone comprises a flange part 39, a central neck part 29 as well as a lower cylindrical part 46.

Flange 39 of the cone is provided on its lower side with a few wave crests/wave valleys 42 and also two ears 47 in its outer periphery, positioned diagonally on the flange to allow the cone, when mounted, to always be mounted in a certain rotational position. The lower cylindrical part 46 of the cone has an outer diameter 20 and this diameter is transformed in its lower part into four, slightly diametrically reduced terminations or legs 48, which are positioned with equal spacing around the periphery. Cylindrical part 46 has two different slits or recesses. There are four slits altogether. Two slits have a design, which is deeper than the two other. The deep slits 49 extend from the lower edge on cylindrical portion 46 all the way up to the same level as the lower side of flange 39. The deep slits are positioned with a 180° division, i.e. diagonally just opposite each other. Between these slits there are two other more shallow slits 50. These slits extend only a small distance upwards towards flange 39.

The design of the slits has been researched in order to obtain the desirable flow characteristics of the valve. Thus, deep slits 49 are designed in such a way, that the flow really corresponds to the connection, which is valid for the flow as a function of the lifting height of the cone and that this connection obtains a preferably modified logarithmic feature. In order to render this possible only two slits are required, the deep ones, those which allow the medium to pass, when the cone starts opening up. Through this division of the flow outlets from inlet side 5 of the valve to outlet side 6 the flow increase will be controlled in a better way, than if all four slits were opened up from the start. With just two slits, which open up in the starting position, this results also in, that width 51 of the slit at its upper part obtains an extension, which results in, that it will be easier for the slot to stay free from coatings and dirt. Flank 52 of deep slit 49 has a design, which has been researched and has a slightly convex shape.

The shallow slits 50 have a design, which will allow the valve in connection with the situation, that it approaches a more open position, i.e. when the cone has come a relatively long distance upwards from the seat, to only then start letting a flow pass. Flank 53 of the shallow slit is only slightly convex and the two flanks meet each other in a central point, which is positioned only a small distance upwards from cylindrical plane 46 and its lower part.

Thanks to ears 47 on flange 39 the cone has obtained a rotational indication, which means, that the cone will always be mounted in such a way, that one of deep slits 49 will end up in front of passage 13 in the valve and is necessary to allow the same flow resistance to always be obtained and consequently the characteristics, when the valve is manufactured and controlled and during the separate installation.

The central part of the cone comprises a neck 29, which extends upwards from flange 39, and this neck has an inner part 25, which is designed in such a way, that an O-ring preferably can be mounted in the neck, and the neck has an upper interface 24, against which the cooperating spindle stops, when the cone is mounted on it. In the central part there is a hole 54 making it possible to mount a screw or the like from below in order to fasten the cone to cooperating spindle 8. As an alternative to an O-ring the cone can be designed with one or several wave crests on inner cylindrical plane 38 of the cone in order to, when a screw is mounted, obtain a sealing between the screw head and the inner surface of the cone.

| ELEMENT LIST: |
| --- |
| 1 = valve body |
| 2 = measuring nipple |
| 3 = knee |
| 4 = valve case |

| ELEMENT LIST: |
| --- |
| 5 = inlet side |
| 6 = outlet side |
| 7 = hand wheel |
| 8 = spindle |
| 9 = cone |
| 10 = valve seat |
| 11 = spring |
| 12 = veil |
| 13 = passage opening |
| 14 = plane |
| 15 = lower edge |
| 16 = index |
| 17 = gap |
| 18 = cavity |
| 19 = seat ring |
| 20 = outer diameter |
| 21 = sealing plane |
| 22 = sealing lip |
| 23 = screw |
| 24 = upper end surface |
| 25 = inner part |
| 26 = end surface |
| 28 = O-ring |
| 29 = neck |
| 30 = cylindrical plane |
| 31 = outer diameter |
| 32 = machining |
| 33 = swing machining |
| 34 = outer part |
| 35 = core |
| 36 = inner diameter |
| 37 = bottom |
| 38 = inner plane |
| 39 = flange |
| 40 = sealing edge |
| 41 = |
| 42 = wave shape |
| 43 = lower surface |
| 44 = sealing edge |
| 45 = recess |
| 46 = cylindrical portion |
| 47 = ear |
| 48 = leg |
| 49 = deep slit |
| 50 = shallow slit |
| 51 = slit width |
| 52 = flank |
| 53 = flank |
| 54 = hole |
| 55 = — |
| 56 = wave crest |

The invention claimed is:

1. A device designed to regulate and control the flow through a valve in a heating and cooling system, the device comprising:

a valve body (1), comprising an inlet side (5), an outlet side (6), and a knee (3), which is machined, for mounting a valve case (4), the inlet side (5) of the knee having a measuring nipple (2) for measuring a pressure on the inlet side and the outlet side (6) having a measuring nipple for measuring a pressure on the outlet side (6) to determine a drop of pressure in the valve body (1) between the inlet side (5) and the outlet side (6), the drop of pressure depending on different adjustments of a cone (9) relative to a valve seat (10) of a seat ring (19) and different adjustments of a veil (12);

the seat ring (19) and the valve seat (10) are arranged in the valve body (1) and cooperate with the cone (9) to form a sealing device to seal the cone (9) against the valve body (1);

the seat ring (19) is mounted in a first machining (32) and a second machining (33) of the valve body (1), the second machining (33) having a slightly larger diameter than the first machining (32);

the cone (9) cooperating with the seat ring (19) has a cylindrical portion (46) with two deep slits (49) and two shallow slits (50) which facilitate regulation of the flow through the valve as the cone (9) is biased between a closed position and an open position;

the cone (9) is mounted on a spindle (8) which is axially biased by a hand wheel (7), and a side of the cone (9) has a flange (39) which sealingly cooperates with the valve seat (10) of the seat ring (19) when the cone (9) is in the closed position;

the veil (12) in the valve body (1) surrounds the valve seat (10) and the cone (9) and is turned in relation to a passage (13) in the valve body (1) to limit a maximum flow through the valve, when the cone (9) is in the open position, a lower edge (15) of the veil (12) is staircase-shaped, which provides a successive increase of flow through the passage (13) in the valve body (1) such that the flow through the passage (13) is variable and depends on a rotational position of the veil (12);

the flow through the valve is controlled via a measurement of the drop of pressure in the valve body (1) between the inlet side (5) and the outlet side (6) of the valve; and the seat ring (19) has a sealing lip (22), which seals against an outer diameter (20) of the cone (9), a first sealing edge (40), which seals against a bottom (37) of the second machining (33), and a second sealing edge (44), which seals against the first machining (32), to form a sealing element and an upper portion of the seat ring (19) cooperates with the cone (9) and forms the valve seat (10).

2. The device according to claim 1, wherein the seat ring (19) is mounted in the valve body (1) and in the first machining (32), which is higher than the second machining (33) having the larger diameter than the first machining (32), the second machining (33) secures an outer, lower part (34) of the seat ring (19), which lower part (34) snaps into the second machining (33), such that the seat ring (19) is fastened in the valve body (1).

3. The device according to claim 1, wherein the valve seat (10) is formed on an upper side of the seat ring (19) such that the valve seat (10) and a surface (14) machined in the knee (3) of the valve body (1) are coplanar.

4. The device according to claim 1, wherein the upper portion of the seat ring (19) has a recess (45), which divides an upper surface of the seat ring (19) into an outer zone, which constitutes the valve seat (10), and an inner part, which constitutes the sealing lip (22).

5. The device according to claim 4, wherein the sealing lip (22) radially extends from an inner diameter (36) of the seat ring (19) to an outer diameter (20) of the cone (9) to prevent flow leakage between the inner part of the seat ring (19) and the cone (9).

6. The device according to claim 2, wherein a lower surface (43) of the seat ring (19) and the first sealing edge (40) of the cone (9) have a wave-shaped design such that, when the seat ring (19) is mounted in the second machining (33), the first sealing edge (40) of the seat ring (19) is pressed against the bottom (37) of the second machining (33) in the valve body (1) to prevent unintentional leakage of flow from the inlet side (5) of the valve body (1) to the outlet side (6) of the valve body (1).

7. The device according to claim 1, wherein the second sealing edge (44) of the seat ring (19) is pressed against the outer diameter (31) of the first machining (32) in the valve body (1) to prevent unintentional leakage from the inlet side (5) of the valve body (1) to the outlet side (6) of the valve body (1).

8. The device according to claim 1, wherein the sealing lip (22), the first and the second sealing edges (40, 44) of the seat ring (19) are elastic to enhance sealing between the seat ring (19) and the valve body (1) and the cone (9).

9. The device according to claim 1, wherein the cone (9) has a flange (39) with a lower surface having a wave shape (42).

10. The device according to claim 9, wherein a wave crest (56) on the lower surface of the flange (39) of the cone (9), when the cone is in the closed position, partially enters into a recess (45) in the valve seat (10) and compresses the sealing lip (22) of the seat ring (19) towards the outer diameter (20) of the cone (9) to enhance sealing between the sealing lip (22) and the cone (9).

11. The device according to claim 1, wherein a recess (45) in the valve seat (10) of the seat ring (19) enhances flexibility of the sealing lip (22) and sealing between the sealing lip (22) and the cone (9), when the cone (9) is axially biased, via the spindle (8), by the hand wheel (7) into the closed position.

12. The device according to claim 1, wherein the deep slits (49) are positioned about the cylindrical portion (46) of the cone (9) approximately 180° from each other and about 90° from the respective shallow slits (50), the deep slits (49) and the shallow slits (50) extend from a lower edge of the cylindrical portion (46) upwards towards the flange (39).

13. The device according to claim 12, wherein the deep slits (49) extend from the lower edge of the cylindrical portion (46) to a level of a lower side of the flange (39) and form legs (48) with the two flanks (52) that have a slight convex shape, a width of the legs (48) and a slit width (51) being sized to form passage areas enabling the flow to correspond to a modified logarithmic function.

14. The device according to claim 1, wherein the shallow slits (50) extend partially from a lower edge of the cylindrical portion (46) to the flange (39) and have a design, which is adjusted to enable a flow to pass, but only when the cone (9) is biased from the close position to the open position, the shallow slits (50) having a flank (53), which only is slightly convex, and the flanks (53) meeting each other at a central point, slightly distanced upwards from the lower part of the cylindrical portion (46), and the shallow slits (50) cooperate with the deep slits (49) facilitating a modified logarithmic flow characteristic regardless of a degree of opening of the cone (9).

15. A device according to claim 1, wherein the cone (9) has two ears (47), positioned diametrically on the flange (39) and with a certain position in relation to the deep and the shallow slits (49, 50) to facilitate an indication of the rotation of the cone (9) in relation to the passage (13) in the valve body (1), such that the deep and the shallow slits (49, 50) always appear in a same position in relation to the passage (13) to facilitate consistent flow across the seat ring (19) and the cone (9).

* * * * *